United States Patent
Chen et al.

(10) Patent No.: US 9,159,279 B2
(45) Date of Patent: Oct. 13, 2015

(54) LIQUID CRYSTAL DISPLAY DEVICE AND DISPLAY CONTROL METHOD THEREOF

(71) Applicant: Shenzhen China Star Optoelectronics Technology Co., Ltd., Shenzhen, Guangdong (CN)

(72) Inventors: Cheng-hung Chen, Shenzhen (CN); Zuomin Liao, Shenzhen (CN)

(73) Assignee: Shenzhen China Star Optoelectronics Technology Co., Ltd, Shenzhen, Guangdong (CN)

(*) Notice: Subject to any disclaimer, the term of this patent is extended or adjusted under 35 U.S.C. 154(b) by 113 days.

(21) Appl. No.: 14/233,385

(22) PCT Filed: Oct. 23, 2013

(86) PCT No.: PCT/CN2013/085770
§ 371 (c)(1),
(2) Date: Jan. 17, 2014

(87) PCT Pub. No.: WO2015/043032
PCT Pub. Date: Apr. 2, 2015

(65) Prior Publication Data
US 2015/0248864 A1    Sep. 3, 2015

(30) Foreign Application Priority Data
Sep. 25, 2013  (CN) .......................... 2013 1 0443306

(51) Int. Cl.
*G09G 3/36* (2006.01)

(52) U.S. Cl.
CPC ............ *G09G 3/3607* (2013.01); *G09G 3/3696* (2013.01); *G09G 2300/0447* (2013.01)

(58) Field of Classification Search
CPC   G09G 3/32022;  G09G 3/3233;  G09G 3/3648
See application file for complete search history.

(56) References Cited

U.S. PATENT DOCUMENTS

| | | | |
|---|---|---|---|
| 2003/0016191 A1* | 1/2003 | Nakamura et al. | 345/55 |
| 2008/0284929 A1* | 11/2008 | Kimura | 349/38 |
| 2010/0007649 A1* | 1/2010 | Tanikame et al. | 345/213 |
| 2010/0245307 A1* | 9/2010 | Kimura et al. | 345/206 |

* cited by examiner

*Primary Examiner* — Shaheda Abdin
(74) *Attorney, Agent, or Firm* — Andrew C. Cheng (57) ABSTRACT

The present invention provides a liquid crystal display device and display control method thereof. Each sub-pixel of the liquid crystal display device includes multiple display regions and multiple control switches for controlling the display regions to receive corresponding data voltages, wherein, the multiple control switches includes a first control switch set and a second control switch set, and the first control switch set and the second control switch set are connected in parallel with the same data line. Through the above way, the present invention can increase the pixel aperture ratio of the wide-viewing-angle liquid crystal display device and decrease the power consumption.

12 Claims, 5 Drawing Sheets

- S810 disposing multiple control switches comprises a first control switch set and a second control switch set, and the first control switch set and the second control switch set are connected in parallel with the same data line.

- S820 applying the corresponding data voltages to the multiple display regions through the data line.

FIG. 7

LIQUID CRYSTAL DISPLAY DEVICE AND DISPLAY CONTROL METHOD THEREOF

BACKGROUND OF THE INVENTION

1. Field of the Invention

The present invention relates to the field of the display technology, and more particularly to a liquid crystal display device and a display control method thereof.

2. Description of Related Art

The liquid crystal display (LCD) market are growing rapidly and expanding its field of application continuously. Especially, in the application of large-size liquid crystal display device, it requires having a wider range of viewing angles, and the wide viewing angle liquid crystal display device easily generates the color shift problem when displaying.

Figure 1:
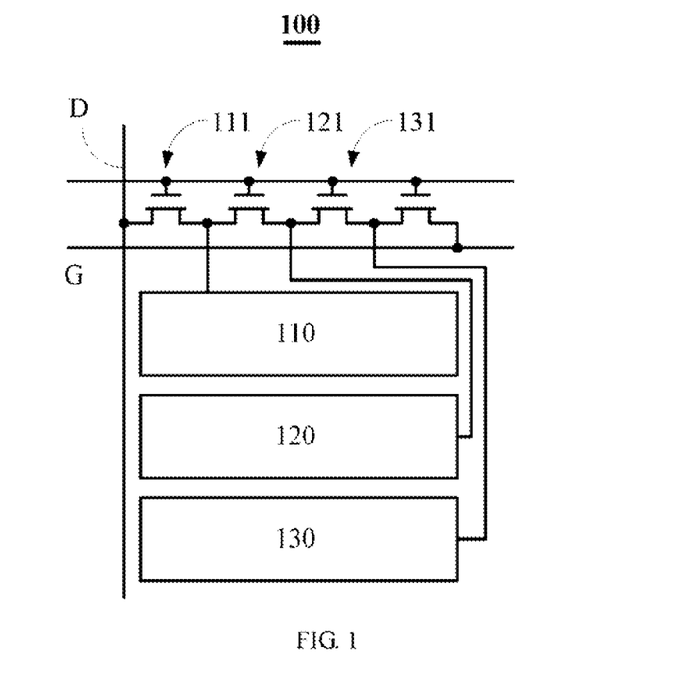
FIG. 1 is a schematic equivalent circuit of the sub-pixel unit of the liquid crystal display device in the prior art.

In order to solve the color shift problem, the prior art mainly disposes multiple display regions for each sub-pixel unit such as shown in FIG. 1. A sub-pixel unit 100 includes three display regions 110,120,130. With reference to FIG. 1, three transistors 111,121,131 corresponding to the three display regions 110,120,130 are connected in series with a data line D for obtaining a data voltage provided by the data line D. When displaying, through the preset width/length ratio of the channel of each transistor, it controls the distribution of the data voltage applied to each display region in order to control the tilt degree of the liquid crystal molecules for adjusting the transmittance of the light.

However, when the distribution voltage of the display region 110 is close to the data voltage provided by the data line D as shown in FIG. 1, the preset channel width of the transistor 111 is very small. Because of the limitation of the TFT fabrication process, the channel width cannot be infinitely small. Therefore, it is required to dispose a large channel width for the transistor 121 (or the transistor 131) such that the difference of the distribution voltage for the both becomes small.

Or, when the distribution voltages for the display regions 120 and 130 are equal, because of the impedance of the transistor 111, 121, the preset channel width of the transistor 131 is very small. Because of the limitation of the TFT fabrication process, its width cannot be infinitely small. Therefore, the channel width of the transistor 121 required to be preset is large.

In both cases, the preset channel width of the transistor 131 is large so that the areas of the opaque transistors are increased so as to decrease the aperture ratio of the pixel and increase the power consumption.

Therefore, it is necessary to provide a liquid crystal display device and a display control method thereof in order to solve the above problems.

SUMMARY OF THE INVENTION

The main object of the present invention is to provide a liquid crystal display device and a display control method thereof, which can increase the pixel aperture ratio of the wide-viewing-angle liquid crystal display device and decrease the power consumption.

In order to solve the above technical problems, a technical solution provided by the present invention is: a liquid crystal display device, comprising: multiple scan lines; multiple data lines; and multiple sub-pixel units, and each sub-pixel unit includes a common electrode line, multiple display regions and multiple control switches for controlling the display regions to receive corresponding data voltages, wherein, the multiple control switches includes a first control switch set and a second control switch set, and the first control switch set and the second control switch set are connected in parallel with the same data line for applying the corresponding data voltages to the multiple display regions through the data line; wherein, the multiple display regions includes a first a first display region, a second display region, and a third display region; the first control switch set includes a first transistor; the second control switch set includes a second transistor and a third transistor; a gate electrode of the first transistor is connected with one of the scan lines, a source electrode of the first transistor is connected with the data line, and a drain electrode of the first transistor is connected with the first display region; a gate electrode of the second transistor is connected with the one scan line, a source electrode of the second transistor is connected with the data line, and a drain electrode of the second transistor is connected with the second display region; a gate electrode of the third transistor is connected with the one scan line, a source electrode of the third transistor is connected with the drain electrode of the second transistor, and a drain electrode of the third transistor is connected with the third display region; the first transistor is connected in series with a fourth transistor, and the third transistor is connected in series with a fifth transistor; a source electrode of the fourth transistor is connected with the drain electrode of the first transistor, a drain electrode of the fourth transistor is connected with the common electrode line, and a gate electrode of the fourth transistor is connected with the one scan line; a source electrode of the fifth transistor is connected with the drain electrode of the third transistor, a drain electrode of the fifth transistor is connected with the common electrode line, and a gate electrode of the fifth transistor is connected with the one scan line.

Wherein, the first display region has the largest display area for the multiple display regions of the sub-pixel unit.

In order to solve the above technical problems, another technical solution provided by the present invention is: a liquid crystal display device, comprising: multiple scan lines; multiple data lines; and multiple sub-pixel units, and each sub-pixel unit includes multiple display regions and multiple control switches for controlling the display regions to receive corresponding data voltages, wherein, the multiple control switches includes a first control switch set and a second control switch set, and the first control switch set and the second control switch set are connected in parallel with the same data line for applying the corresponding data voltages to the multiple display regions through the data line.

Wherein, the multiple display regions includes a first display region, a second display region, and a third display region; the first control switch set includes a first transistor; the second control switch set includes a second transistor and a third transistor; wherein, a gate electrode of the first transistor is connected with one of the scan lines, a source electrode of the first transistor is connected with the data line, and a drain electrode of the first transistor is connected with the first display region; a gate electrode of the second transistor is connected with the one scan line, a source electrode of the second transistor is connected with the data line, and a drain electrode of the second transistor is connected with the second display region; a gate electrode of the third transistor is connected with the one scan line, a source electrode of the third transistor is connected with the drain electrode of the second transistor, and a drain electrode of the third transistor is connected with the third display region.

Wherein, the sub-pixel unit further comprises a common electrode line, and the first transistor is connected in series with a fourth transistor, wherein, a source electrode of the fourth transistor is connected with the drain electrode of the first transistor, a drain electrode of the fourth transistor is connected with the common electrode line, and a gate electrode of the fourth transistor is connected with the one scan line.

Wherein, the sub-pixel unit further comprises a common electrode line, and the third transistor is connected in series with a fifth transistor, wherein, a source electrode of the fifth transistor is connected with the drain electrode of the third transistor, a drain electrode of the fifth transistor is connected with the common electrode line, and a gate electrode of the fifth transistor is connected with the one scan line.

Wherein, the first display region has the largest display area for the multiple display regions of the sub-pixel unit.

In order to solve the above technical problems, another technical solution provided by the present invention is: a display control method for a liquid crystal display device, wherein, the liquid crystal display device includes multiple scan lines, multiple data lines, and multiple sub-pixel units, and each sub-pixel unit includes multiple display regions and multiple control switches for controlling the display regions to receive corresponding data voltages, the method comprising: disposing the multiple control switches to include a first control switch set and a second control switch set, and the first control switch set and the second control switch set are connected in parallel with the same data line; and applying the corresponding data voltages to the multiple display regions through the data line.

Wherein, the multiple display regions includes a first display region, a second display region, and a third display region; the first control switch set includes a first transistor; the second control switch set includes a second transistor and a third transistor; wherein, a gate electrode of the first transistor is connected with one of the scan lines, a source electrode of the first transistor is connected with the data line, and a drain electrode of the first transistor is connected with the first display region; a gate electrode of the second transistor is connected with the one scan line, a source electrode of the second transistor is connected with the data line, and a drain electrode of the second transistor is connected with the second display region; a gate electrode of the third transistor is connected with the one scan line, a source electrode of the third transistor is connected with the drain electrode of the second transistor, and a drain electrode of the third transistor is connected with the third display region.

Wherein, the sub-pixel unit further comprises a common electrode line, and the first transistor is connected in series with a fourth transistor, wherein, a source electrode of the fourth transistor is connected with the drain electrode of the first transistor, a drain electrode of the fourth transistor is connected with the common electrode line, and a gate electrode of the fourth transistor is connected with the one scan line.

Wherein, the sub-pixel unit further comprises a common electrode line, and the third transistor is connected in series with a fifth transistor, wherein, a source electrode of the fifth transistor is connected with the drain electrode of the third transistor, a drain electrode of the fifth transistor is connected with the common electrode line, and a gate electrode of the fifth transistor is connected with the one scan line.

Wherein, the first display region has the largest display area for the multiple display regions of the sub-pixel unit.

The beneficial effects of the present invention are: the liquid crystal display device of the present invention, through disposing each sub-pixel unit includes multiple display regions and multiple control switches, wherein the multiple control switches comprises a first control switch set and a second control switch set, and the first control switch set and the second control switch set are connected in parallel with the same data line such that when applying the corresponding data voltages to the multiple display regions through the data line, a voltage sum of the first control switch set is equal to a voltage sum of the second control switch set. Therefore, comparing to the conventional art with one of the control switch sets, the preset channel width is greatly reduced, and overall speaking, a sum of the areas occupied by the multiple control switches is reduced, which can increase the pixel aperture of the liquid crystal display device with wide viewing angle and decrease the power consumption.

DETAILED DESCRIPTION OF THE PREFERRED EMBODIMENT

The following will combine FIG. 2 to FIG. 7 and embodiments for detail description of the present invention.

Figure 2:
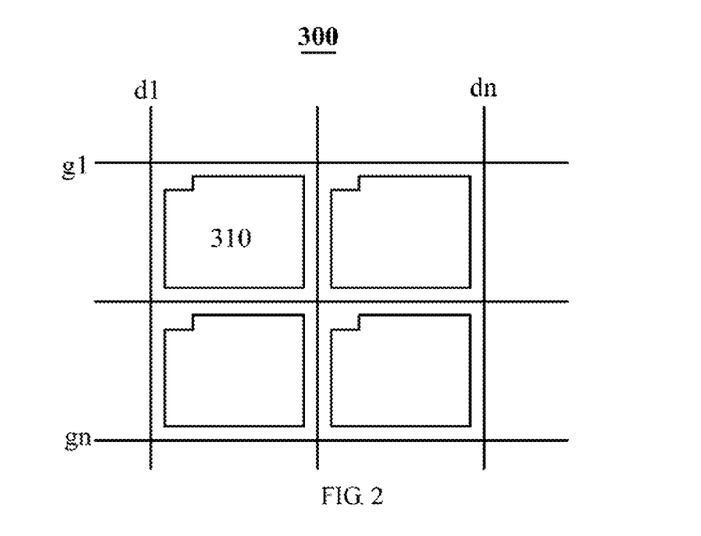
FIG. 2 is a schematic equivalent circuit of a liquid crystal display device according to an embodiment of the present invention.

With reference to FIG. 2, it is a schematic structure diagram of a liquid crystal display device according to an embodiment of the present invention. As shown in FIG. 2, the liquid crystal display device 300 of this embodiment comprises multiple scan lines g1-gn, multiple data lines d1-dn. The multiple scan lines g1-gn and the multiple data lines d1-dn are insulated and intersected vertically, and correspondingly disposed around to define a sub-pixel unit 310 of the liquid crystal display device 300.

Figure 3:
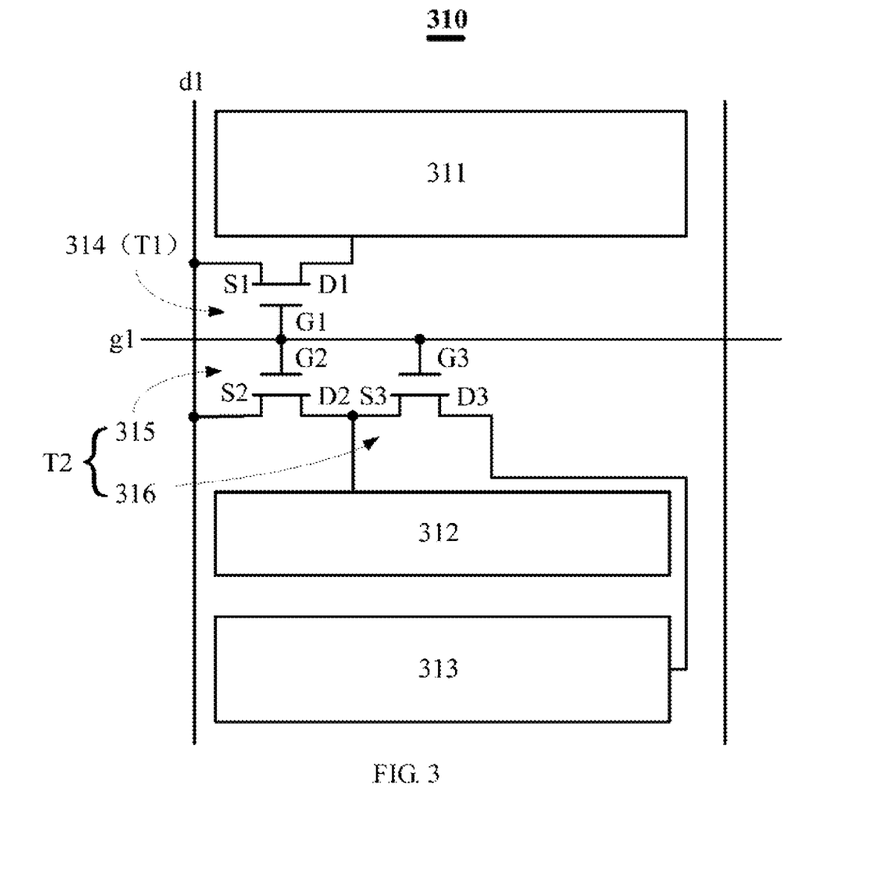
FIG. 3 is a schematic equivalent circuit of a sub-pixel unit according to a first embodiment of the present invention.

In the present invention, each sub-pixel unit 310 also includes multiple display regions and corresponding multiple control switches, and preferably, the control switches are thin film transistors. Specifically, please refer to the schematic equivalent circuit of the sub-pixel unit 310 as shown in FIG. 3. The sub-pixel unit 310 in this embodiment includes a first display region 311, a second display region 312, a third display region 313, a first transistor 314, a second transistor 315 and a third transistor 316.

Wherein, the first transistor 314, the second transistor 315 and the third transistor 316 are divided into two sets. In the present embodiment, the control switch T1 of the first set of includes the first switch 314, and the control switch T2 of the second set includes the second transistor 315 and the third transistor 316. It should be understood that the control switch T1 of the first set may not only include one thin film transistor. In another embodiment, the control switch T1 of the first set may also include multiple thin film transistors, and it just to meet the condition that the control switch T1 of the first set and control switch T2 of the second set connects in parallel with the same data line d1. Base on the multiple control switches of the present embodiment, specifically, a gate electrode G1 of the first transistor 314 is connected with the scan line g1; a source electrode S1 is connected with the data line d1; a drain electrode D1 is connected with the first display region 311. A gate electrode G2 of the second transistor 315 is connected with the scan line g1; a source electrode S2 is connected with the data line d1; a drain electrode D2 is connected with the second display region 312. A gate electrode G3 of the third transistor 316 is connected with the scan line g1; a source electrode S3 is connected with the drain electrode D2 of the second transistor 315; a drain electrode D3 is connected with the third display region 313.

Compared to the sub-pixel unit 100 of the prior art shown in FIG. 1, the present embodiment can be seen as connecting the transistor 121 which has the largest area because of having the largest channel width with the transistors 111 and 131 in parallel. That is, the first display region 311 and the first transistor 314 of the present embodiment equal to the display region 120 and the transistor 121 in FIG. 1.

The second display region 312 and the second transistor 315 of the present embodiment equals to the display region 110 and the transistor 111 in FIG. 1. The third display region 313 and the third transistor 316 of the present embodiment equals to the display region 130 and the transistor 131 in FIG. 1. Therefore, the present embodiment can individually control the first transistor 314 and the first display region 311.

When the data line d1 applies the same data voltage as FIG. 1 to the first display region 311, the second display region 312, and the third display region 313, although the channel width of the second transistor 315 is increased comparing with the channel width of the transistor 131 in FIG. 1, however, because of the parallel connection, the voltage distributed at the first transistor 314 is the sum of the voltage distributed at the second transistor 315 and the third transistor 316 such that the channel width of the first transistor 314 is much smaller than the channel width of the transistor shown in FIG. 1. Therefore, overall speaking, the total area occupied by the first transistor 314, the second transistor 315, and the third transistor 316 is much smaller than the total area occupied by three transistors 111, 121, 131 in FIG. 1 in order to increase the light transparent area of each sub-pixel unit and the aperture ratio of the pixel. Besides, preferably, the display area of the first display region 311 is larger than anyone of the display area of the second display region 312 and the third display region 313, which can decrease the power consumption better.

Figure 4:
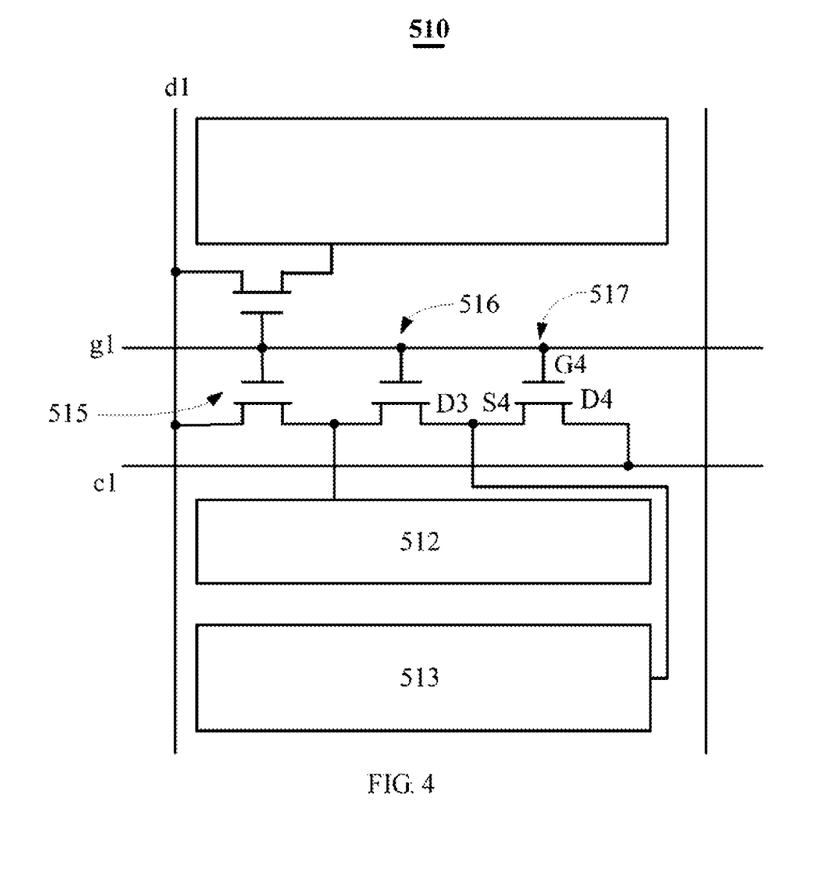
FIG. 4 is a schematic equivalent circuit of a sub-pixel unit according to a second embodiment of the present invention.

FIG. 4 is a schematic equivalent circuit of a sub-pixel unit according to a second embodiment of the present invention. As shown in FIG. 4, a sub-pixel unit 510 of this embodiment further includes a common electrode line c1, which is based on the embodiment shown in FIG. 3, and further includes a fourth transistor 517.

Wherein, a source electrode S4 of the fourth transistor 517 is connected with the drain electrode D3 of the third transistor 516 (corresponds to the third transistor 316 shown in FIG. 3). The drain electrode D4 connects with the common electrode line c1, and a gate electrode G4 connects with the scan line g1.

When distribute the voltages applied at the second display region 512 and the third display region 513, the fourth transistor 517 mainly used for voltage dividing. And when the data line d1 stop providing power to the second transistor 515 and the third transistor 516, the fourth transistor 517 can prevent the voltage at the common electrode c1 from returning in order to avoid generate flicker phenomenon at the display screen.

Figure 5:
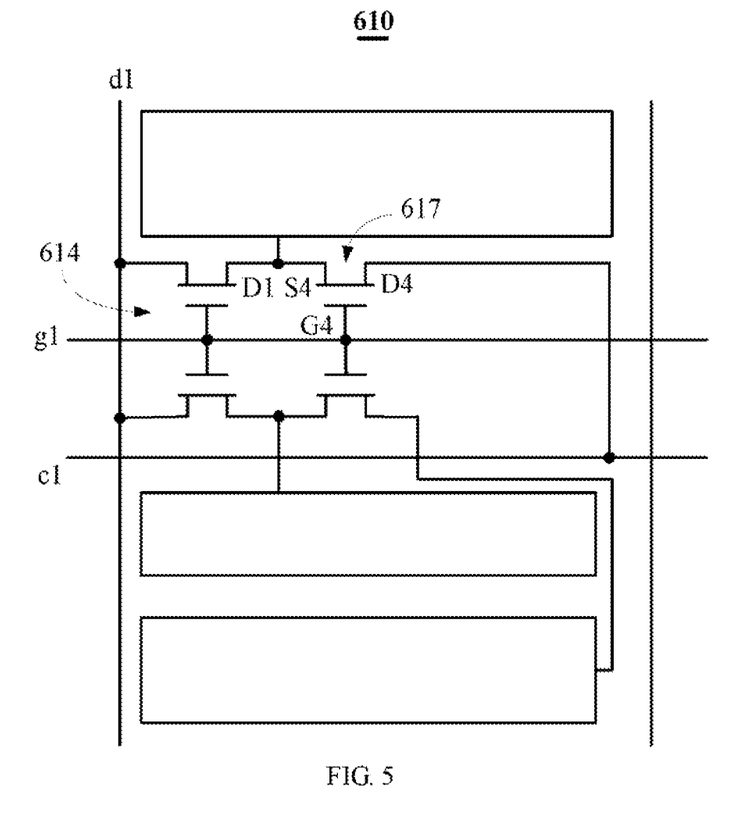
FIG. 5 is a schematic equivalent circuit of a sub-pixel unit according to a third embodiment of the present invention.

It should be understood that in a third embodiment of the present invention, it can dispose a first transistor 614 (corresponds to the first transistor 314 shown in FIG. 3) and connected in series with a fourth transistor 617 based on the embodiment shown in FIG. 3 to form a sub-pixel unit 610 as shown in FIG. 5, wherein the sub-pixel unit 610 further includes the common electrode line c1.

Wherein, the source electrode S4 of the fourth transistor 617 connects with a drain electrode D1 of the first transistor 614 and the drain electrode D4 connects with the common electrode line c1. The gate electrode G4 connects with the scan line g1. In this embodiment, the fourth transistor 617 mainly functions as voltage dividing and prevents the current from flowing back.

Figure 6:
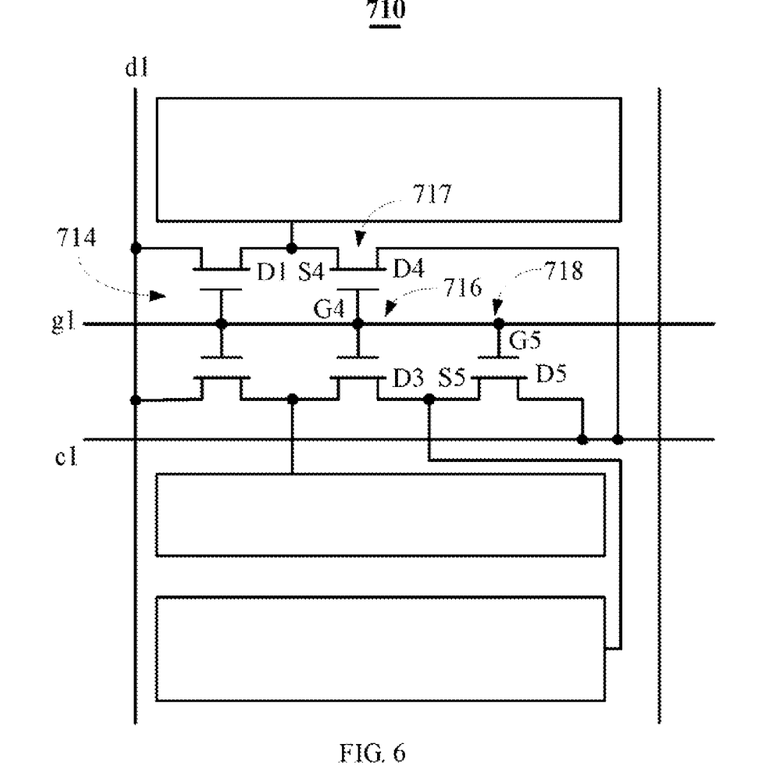
FIG. 6 is a schematic equivalent circuit of a sub-pixel unit according to a fourth embodiment of the present invention.

In a fourth embodiment of the present invention, it can dispose a first transistor 714 (corresponds to the first transistor 314 shown in FIG. 3) to connect in series with a fourth transistor 717 based on the embodiment shown in FIG. 3. At the same time, a third transistor 716 (corresponds to the third transistor 316 shown in FIG. 3) connects in series with a fifth transistor 718 to form a sub-pixel unit 710 shown in FIG. 6, wherein the sub-pixel unit 710 further includes the common electrode line c1.

Wherein a source electrode S4 of the fourth transistor 717 connects with a drain electrode D1 of the first transistor 714 and the drain electrode D4 connects with the common electrode line c1. A gate electrode G4 connects with the scan line g1. A source electrode S5 of the fifth transistor 718 connects with the drain electrode D3 of the third transistor 716. A drain electrode D5 connects with the common electrode line c1. The gate electrode G5 connects with the scan line g1. In this embodiment, the fourth transistor 717 and the fifth transistor 718 mainly function for voltage dividing and prevent the current from flowing back.

Figure 7:
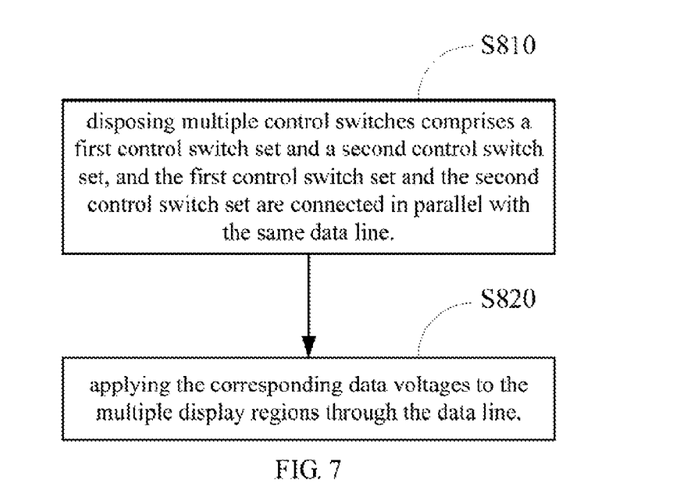
FIG. 7 is a flow chart of a display control method of a liquid crystal display device according to an embodiment of the present invention.

Furthermore, the present invention also provides a display control method for a liquid crystal display device. As shown in FIG. 7, the display control method of the present embodiment mainly comprises:

Step S810: disposing multiple control switches comprises a first control switch set and a second control switch set, and the first control switch set and the second control switch set are connected in parallel with the same data line.

Step S820: applying the corresponding data voltages to the multiple display regions through the data line.

The display control method of this embodiment based on the liquid crystal display device 200 described at the above embodiments, and has the same beneficial effects as anyone of the sub-pixel units 510, 610, 710 in the above embodiments. The specific content can refer to the above embodiments, and it will not repeat again.

In summary, the liquid crystal display device of the present invention, through disposing each sub-pixel unit includes multiple display regions and multiple control switches, wherein the multiple control switches comprises a first control switch set and a second control switch set, and the first control switch set and the second control switch set are connected in parallel with the same data line such that when applying the corresponding data voltages to the multiple display regions through the data line, a voltage sum of the first control switch set is equal to a voltage sum of the second control switch set. Therefore, comparing to the conventional art with one of the control switch sets, the preset channel width is greatly reduced, and overall speaking, a sum of the areas occupied by the multiple control switches is reduced, which can increase the pixel aperture of the liquid crystal display device with wide viewing angle and decrease the power consumption.

The above embodiments of the present invention are not used to limit the claims of this invention. Any use of the content in the specification or in the drawings of the present invention which produces equivalent structures or equivalent processes, or directly or indirectly used in other related technical fields is still covered by the claims in the present invention.

What is claimed is:

1. A liquid crystal display device, comprising:
multiple scan lines;
multiple data lines; and
multiple sub-pixel units, and each sub-pixel unit includes a common electrode line, multiple display regions and multiple control switches for controlling the display regions to receive corresponding data voltages, wherein, the multiple control switches includes a first control switch set and a second control switch set, and the first control switch set and the second control switch set are connected in parallel with the same data line for applying the corresponding data voltages to the multiple display regions through the data line; wherein,
the multiple display regions includes a first a first display region, a second display region, and a third display region; the first control switch set includes a first transistor; the second control switch set includes a second transistor and a third transistor; a gate electrode of the first transistor is connected with one of the scan lines, a source electrode of the first transistor is connected with the data line, and a drain electrode of the first transistor is connected with the first display region; a gate electrode of the second transistor is connected with the one scan line, a source electrode of the second transistor is connected with the data line, and a drain electrode of the second transistor is connected with the second display region; a gate electrode of the third transistor is connected with the one scan line, a source electrode of the third transistor is connected with the drain electrode of the second transistor, and a drain electrode of the third transistor is connected with the third display region;
the first transistor is connected in series with a fourth transistor, and the third transistor is connected in series with a fifth transistor; a source electrode of the fourth transistor is connected with the drain electrode of the first transistor, a drain electrode of the fourth transistor is connected with the common electrode line, and a gate electrode of the fourth transistor is connected with the one scan line; a source electrode of the fifth transistor is connected with the drain electrode of the third transistor, a drain electrode of the fifth transistor is connected with the common electrode line, and a gate electrode of the fifth transistor is connected with the one scan line.

2. The liquid crystal display device according to claim 1, wherein, the first display region has the largest display area for the multiple display regions of the sub-pixel unit.

3. A liquid crystal display device, comprising:
multiple scan lines;
multiple data lines; and
multiple sub-pixel units, and each sub-pixel unit includes multiple display regions and multiple control switches for controlling the display regions to receive corresponding data voltages, wherein, the multiple control switches includes a first control switch set and a second control switch set, and the first control switch set and the second control switch set are connected in parallel with the same data line for applying the corresponding data voltages to the multiple display regions through the data line.

4. The liquid crystal display device according to claim 3, wherein, the multiple display regions includes a first display region, a second display region, and a third display region; the first control switch set includes a first transistor; the second control switch set includes a second transistor and a third transistor; wherein,
a gate electrode of the first transistor is connected with one of the scan lines, a source electrode of the first transistor is connected with the data line, and a drain electrode of the first transistor is connected with the first display region;
a gate electrode of the second transistor is connected with the one scan line, a source electrode of the second transistor is connected with the data line, and a drain electrode of the second transistor is connected with the second display region;
a gate electrode of the third transistor is connected with the one scan line, a source electrode of the third transistor is connected with the drain electrode of the second transistor, and a drain electrode of the third transistor is connected with the third display region.

5. The liquid crystal display device according to claim 4, wherein, the sub-pixel unit further comprises a common electrode line, and the first transistor is connected in series with a fourth transistor, wherein, a source electrode of the fourth transistor is connected with the drain electrode of the first transistor, a drain electrode of the fourth transistor is connected with the common electrode line, and a gate electrode of the fourth transistor is connected with the one scan line.

6. The liquid crystal display device according to claim 4, wherein, the sub-pixel unit further comprises a common electrode line, and the third transistor is connected in series with a fifth transistor, wherein, a source electrode of the fifth transistor is connected with the drain electrode of the third transistor, a drain electrode of the fifth transistor is connected with the common electrode line, and a gate electrode of the fifth transistor is connected with the one scan line.

7. The liquid crystal display device according to claim 4, wherein, the first display region has the largest display area for the multiple display regions of the sub-pixel unit.

8. A display control method for a liquid crystal display device, wherein, the liquid crystal display device includes multiple scan lines, multiple data lines, and multiple sub-pixel units, and each sub-pixel unit includes multiple display regions and multiple control switches for controlling the display regions to receive corresponding data voltages, the method comprising:
disposing the multiple control switches to include a first control switch set and a second control switch set, and the first control switch set and the second control switch set are connected in parallel with the same data line; and
applying the corresponding data voltages to the multiple display regions through the data line.

9. The display control method according to claim 8, wherein, the multiple display regions includes a first display region, a second display region, and a third display region; the first control switch set includes a first transistor; the second control switch set includes a second transistor and a third transistor; wherein,
a gate electrode of the first transistor is connected with one of the scan lines, a source electrode of the first transistor is connected with the data line, and a drain electrode of the first transistor is connected with the first display region;
a gate electrode of the second transistor is connected with the one scan line, a source electrode of the second transistor is connected with the data line, and a drain electrode of the second transistor is connected with the second display region;

a gate electrode of the third transistor is connected with the one scan line, a source electrode of the third transistor is connected with the drain electrode of the second transistor, and a drain electrode of the third transistor is connected with the third display region.

10. The display control method according to claim 9, wherein, the sub-pixel unit further comprises a common electrode line, and the first transistor is connected in series with a fourth transistor, wherein, a source electrode of the fourth transistor is connected with the drain electrode of the first transistor, a drain electrode of the fourth transistor is connected with the common electrode line, and a gate electrode of the fourth transistor is connected with the one scan line.

11. The display control method according to claim 9, wherein, the sub-pixel unit further comprises a common electrode line, and the third transistor is connected in series with a fifth transistor, wherein, a source electrode of the fifth transistor is connected with the drain electrode of the third transistor, a drain electrode of the fifth transistor is connected with the common electrode line, and a gate electrode of the fifth transistor is connected with the one scan line.

12. The display control method according to claim 9, wherein, the first display region has the largest display area for the multiple display regions of the sub-pixel unit.

\* \* \* \* \*